United States Patent [19]

Bridges et al.

[11] Patent Number: 4,670,634
[45] Date of Patent: Jun. 2, 1987

[54] IN SITU DECONTAMINATION OF SPILLS AND LANDFILLS BY RADIO FREQUENCY HEATING

[75] Inventors: Jack E. Bridges, Park Ridge; Harsh Dev, Chicago, both of Ill.; Richard H. Snow, Bartlesville, Okla.; Allen Taflove, Wilmette, Ill.

[73] Assignee: IIT Research Institute, Chicago, Ill.

[21] Appl. No.: 720,070

[22] Filed: Apr. 5, 1985

[51] Int. Cl.⁴ ............................................. H05B 6/54
[52] U.S. Cl. ................................ 219/10.41; 219/10.57; 219/10.81; 166/60; 166/248; 299/6; 299/14; 405/131
[58] Field of Search ............... 219/10.81, 10.57, 10.41, 219/10.43, 10.55 A, 10.55 R, 10.55 M; 299/14, 5, 6; 166/248, 60, 65.1; 405/258, 131

[56] References Cited

U.S. PATENT DOCUMENTS

| Re. 30,738 | 9/1981 | Bridges et al. | 166/248 |
|---|---|---|---|
| 3,586,624 | 6/1971 | Larson | 210/3 |
| 3,601,448 | 8/1971 | Stone | 299/14 |
| 3,866,255 | 2/1975 | Serota | 219/10.81 X |
| 4,140,179 | 2/1979 | Kasevich et al. | 166/138 |
| 4,296,298 | 10/1981 | MacMaster et al. | 219/10.81 |
| 4,323,367 | 4/1982 | Ghosh | 48/197 |
| 4,376,033 | 3/1983 | Calderon | 208/11 R |
| 4,376,598 | 3/1983 | Brouns et al. | 405/258 |
| 4,396,402 | 8/1983 | Ghosh | 48/197 A |
| 4,401,569 | 8/1983 | Jhaveri et al. | 110/610 |
| 4,469,176 | 9/1984 | Zison et al. | 166/250 |
| 4,545,435 | 10/1985 | Bridges et al. | 219/10.55 R X |
| 4,590,348 | 5/1986 | Lahti et al. | 299/14 X |

OTHER PUBLICATIONS

Von Hippel, Arthur R., Ed., "Dielectric Materials and Applications," John Wiley and Sons, 1954, pp. 3-21.
Barnhart, Benjamin J., "The Disposal of Hazardous Wastes," Environmental Science & Technology, vol. 12, No. 10, Oct. 1978, pp. 1132-1136.
Murray, Chris, "Chemical Waste Disposal a Costly Problem," Chemical and Engineering News, Mar. 12, 1979, pp. 12-16.
Maugh, Thomas H., II, "Toxic Waste Disposal a Growing Problem," Science, vol. 204, May 25, 1979, pp. 819-823.
Maugh, Thomas H., II, "Hazardous Wastes Technology is Available," Science, vol. 204, Jun. 1, 1979, pp. 930-933.
Duvall, D. S., W. A. Rubey and S. A. Mescher, "High Temperature Decomposition of Organic Hazardous Waste," Treatment of Hazardous Waste, Proceedings of the Sixth Annual Research Symposium, D. Schultz, Ed., Chicago, EPA 600/9-80-011, Mar. 1980, pp. 121-131.
Bridges, J., G. Sresty, A. Taflove and R. Snow, "Radio-Frequency/Heating to Recover Oil from Utah Tar Sands," Future of Heavy Crude and Tar Sands, McGraw Hill, 1980, pp. 396-409.
Carlson, R. D., E. F. Blase and T. R. McLendon, "Development of the IIT Research Institute RF Heating Process for In Situ Oil Shale/Tar Sand Fuel Extraction—An Overview," 14th Oil Shale Symposium Proceedings, Colorado Schl. of Mines, Golden, Colo., Apr. 22-24, 1981, pp. 138-145.

Primary Examiner—Philip H. Leung
Attorney, Agent, or Firm—Fitch, Even, Tabin & Flannery

[57] ABSTRACT

A water-containing region at or near the surface of the earth, such as a landfill, that is contaminated with hazardous materials is decontaminated by heating the region with bound radio frequency energy from a bound-wave transmission line exciter array disposed outside the region to a temperature to boil water and thereby increase the permeability of the region. The heating is continued by dielectric heating after water has boiled from at least a portion of the region to heat the portion to elevated temperatures substantially above the boiling point of water. The materials may then be rendered innocuous in situ in a number of ways, as by pyrolysis, thermally assisted decomposition, or reaction with an introduced reagent, such as oxygen. The materials may also be driven from the region, as by distillation or by evaporation and steam drive and then collected and disposed of, as by incineration.

19 Claims, 7 Drawing Figures (List continued on next page.)

OTHER PUBLICATIONS

Kastansky, J., J. Bridges, R. Snow, G. Sresty and A. Taflove, "RF Heating of Carbonaceous Deposits," DOE Report DOE/ER/10281-1, IIT Research Institute, Chicago, vols. I and II, Mar. 1982.

Scholz, Robert and Joseph Milanowski, Mobile System for Extracting Spilled Hazardous Materials from Excavated Soils," 1982 Hazardous Material Spills Conference Proceedings, Apr. 19–22, 1982, pp. 111–115.

Brugger, John E., James J. Yezzi, Jr., Ira Wilder, Frank J. Freestone, Richard A. Miller and Charles Pfrommer, Jr., "The Epa-Ord Mobile Incineration System: Present Status," 1982 Hazardous Material Spills Conference Proceedings, Apr. 19–22, 1982, pp. 116–126.

Dev, Harsh, Jack E. Bridges, and Guggilam C. Sresty, "Decontamination of Hazardous Waste Substances from Spills and Uncontrolled Waste Sites by Radio Frequency In Situ Heating," 1984 Hazardous Material Spills Conference Proceedings, Apr. 9–12, 1984, pp. 57–64.

Whittaker, Harry, "Development of a Mobile Reverse Osmosis Unit for Spill Cleanup," 1984 Hazardous Material Spills Conference Proceedings, Apr. 9–12, 1984, pp. 65–72.

Hornig, Arthur W., "Destruction of PCB-Contaminated Soils with a High-Temperature Fluid-Wall (HTFW) Reactor," 1984 Hazardous Material Spills Conference Proceedings, Apr. 9–12, 1984, pp. 73–79.

Yezzi, James J., Jr., John E. Brugger, Ira Wilder, Frank Freestone, Richard A. Miller, Charles Pfrommer, Jr., and Ralph Lovell, "The EPA-ORD Mobile Incineration System Trial Burn," 1984 Hazardous Material Spills Conference Proceedings, Apr. 9–12, 1984, pp. 80–91.

Paulson, D. L., Jr., R. Honeycutt, H. Lebaron, and V. Seim, "Degradation of High Concentrations of Diazinon in Soil by Parathion Hydrolase," 1984 Hazardous Material Spills Conference Proceedings, Apr. 9–12, 1984, pp. 92–97.

Isbister, Jenefir D., George L. Anspach, and Judith F. Kitchens, "Composting for Degradation of PCBs in Soil," 1984 Hazardous Material Spills Conference Proceedings, Apr. 9–12, 1984, pp. 104–109.

Kitchens, Judith F., George L. Anspach, Laura B. Mangoba, and Edmund A. Kobylinski, "Cleanup of Spilled Chlorinated Organics with The LARC Process," 1984 Hazardous Material Spills Conference Proceedings, Apr. 9–12, 1984, Chemical and Engineering News, pp. 110–115.

IN SITU DECONTAMINATION OF SPILLS AND LANDFILLS BY RADIO FREQUENCY HEATING

BACKGROUND OF THE INVENTION

This invention relates generally to the decontamination of spills and landfills and more particularly to such decontamination in situ using radio frequency heating.

Hazardous waste materials have been improperly deposited in thousands of sites all over the United States and, indeed, all over the world. Uncontrolled landfills have been used as convenient, but inadequate, disposal sites for industrially generated wastes, while other sites have been contaminated by accidental spills of hazardous materials. There are many sites where hazardous materials were spilled prior to the discovery of the hazardous nature of the materials being handled. Many hazardous materials found at these sites are stable, do not undergo environmental degradation at reasonably fast rates, have high boiling points and are considered toxic at very low concentration levels, and bio-accumulate in various species of the food chain at concentrations higher than that found in the environment.

Complete reclamation or isolation of such sites is preferred, but the cost associated with site disturbance by available methods has been considered prohibitive. The treatment of contaminated soil from such sites in an incinerator has not been a practical solution for several reasons, including the high cost of excavation and incineration, shortage of incineration capacity, inadequate methods and capacity for ash-disposal in the incinerators, and the hazards and risks associated with site disturbance and transportation. The treatment of uncontrolled landfills and spills would benefit from an in situ process that eliminates or alleviates these disadvantages and risks. Radio frequency (RF) heating applied in accordance with the present invention offers a viable in situ method for treatment of contaminated sites.

The term RF refers to frequencies used in wireless communication and represents a wide frequency range from 45 Hz to 10 gigahertz (GHz). However, the frequencies of interest for in situ soil heating lie principally between 0.5 to 45 MHz. For dry soils, in this frequency range, dipolar molecules absorb electromagnetic (EM) energy which is converted to heat due to dipole rotation and molecular vibration. The absorption of EM energy and conversion to heat occurs throughout the volume of the material and is not dependent on the relatively slow process of thermal conduction. The amount of energy dissipated in the heated soil is proportional to the dielectric constant, the loss tangent, frequency and the square of the field strength of the applied electromagnetic energy. The penetration depth of the applied fields is inversely related to frequency and the conductivity of the soil. Thus, for any given soil, frequency may be selected to provide the required penetration depth. Penetration of EM energy of a few to more than 50 meters can typically be achieved.

In situ heating of earth formations by high-frequency displacement currents is well known, particularly in the production of petroleum products, such as shale oil. Alternatively, heating by conduction currents at relatively low frequencies is also possible, but such heating is limited to earth that remains conductive, generally requiring the presence of water and, hence, operating at relatively low temperatures below the boiling point of water or requiring maintenance of pressure. Conduction heating at very high temperatures for the immobilization of radioactive components in soil is shown in Brouns, et al. U.S. Pat. No. 4,376,598, where conductive material was shown added to the soil to assure conduction, and the soil was shown heated to vitrification at temperatures as high as 1500° C. whereat radioactive contaminants are fused with the silicates in the soil to form a glass or similar product which, upon, cooling forms a stable mass.

In situ heating of earth formations with RF is shown in Bridges, et al. U.S. Pat. No. Re. 30,738 and Kasevich, et al. U.S. Pat. No. 4,140,179. The former discloses the use of RF from a tri-plate line buried in the earth to heat a block of earth formations uniformly by displacement currents, leading to dielectric heating. The latter discloses radiating RF energy into the earth.

SUMMARY OF THE INVENTION

In accordance with the present invention, a portion of the earth near the surface is selectively heated with RF energy from a transmission line array to which the RF energy is bound. That is, there is substantially no radiation, for radiation would contaminate the environment and would wastefully transmit energy well beyond the contaminated region. In accordance with the present invention, the RF energy is applied to evaporate water in the contaminated region, thus rendering it permeable and permitting dielectric heating. Hazardous materials are then rendered innocuous, which may involve pyrolysis of noxious materials and the incineration of the captured effluents of a hazardous nature.

Using these RF heating methods, soils can be heated to a temperature range of 100° C. to 400° C. in a relatively short time, corresponding to heating rates of 0.3° to 1.0° C. per hour. The maximum heating rate is determined by the electrical breakdown field strength of the materials.

The application of RF energy to soil requires three hardware components. These are: (a) a radio frequency power source, (b) power transmission cables with impedance matching networks, and (c) an RF energy applicator. In accordance with the invention, the applicator comprises an array of electrodes disposed preferably outside the boundaries of the contaminated region, as in horizontal rows a short distance above the surface of the soil or at the ends of a region. These electrodes are energized by the RF power source.

In one embodiment of the invention, the top exposed surface of the heated volume of soil is covered by a vapor and gas containment and recovery barrier. The purpose of this is to prevent the gases and vapors from leaking to the environment and also to collect them for treatment. The vapor barrier preferably consists of prefabricated metal or air-inflatable fabric structures. A mobile trailer mounted gas handling system may be used for condensation of the vapors and ultimate disposal of the gases and the condensate. The gases may be incinerated on site by means of mobile incineration equipment, such as has been developed by EPA-ORD (U.S. Environmental Protection Agency, Office of Research and Development). Another alternative for gas treatment is carbon adsorption for the removal of hydrocarbons. The liquid may be incinerated on site or shipped to a full-scale incinerator.

Decontamination of the heated soil can be achieved by one of several mechanisms, including:

(a) Pyrolysis, thermal decomposition, distillation, saturated or superheated steam distillation in the temperature range of 100° to 400° C. over residence times of 7 to 14 days.

(b) Oxidation and/or gasification of the hydrocarbon fraction by injection of oxygen, air, steam or any combination thereof through injection and fluid recovery wells drilled at the boundaries of the contaminated volume.

(c) Reaction with chemical reagents which react with the contaminants.

It is thus an important aspect of the present invention to decontaminate soils by RF heating from fields created by a bound-wave structure. Another aspect is to use such heating to evaporate water in the soil, providing permeability and permitting dielectric RF heating. A further aspect is to render hazardous material in heated soil innocuous and to dispose of effluents. These and other aspects, objects and advantages of the present invention will become apparent from the following detailed description, particularly when taken in conjunction with the accompanying drawings.

DETAILED DESCRIPTION OF PREFERRED EMBODIMENTS

As mentioned above, the present invention is directed to the in situ decontamination of spills and landfills utilizing radio frequency heating. In accordance with this invention such heating is achieved by a bound-wave fringing-field transmission line excitor disposed adjacent but outside the contaminated region. Such heating raises the temperature to boil away water in the material and render the material more permeable. The heating is continued by dielectric heating. The heated soil is then decontaminated by one or more of a number of mechanisms, depending upon the particular materials, and more specifically upon their physical and chemical properties and biological toxicity. Cost is also a factor.

Soil may be heated from the fringing-field line as follows: Displacement currents are induced to flow in the initially moist soil from the transmission line array. Where moisture is present, a combination of heating effects take place: Conduction heating due to the moisture in the pore spaces and dielectric heating in the supporting soil matrix. Because water is a very polar molecule and water permits ionically related conduction currents, the energy in the displacement currents penetrating the soil is rapidly absorbed. Upon evaporation of the water, the ability of the dry soil to absorb electromagnetic energy is significantly reduced. The induced displacement currents now penetrate further before being absorbed in the now more distant wet soil. This process continues until the dry zone is extended into the reduced field region of the transmission line.

Heating in the dry zone is then continued to temperatures above the vaporization point of water in the soil by displacement current and loss mechanisms in the dry soil matrix, such as dielectric absorption. In some soils, full dehydration does not take place until the soil has been heated to a temperature well over the usual vaporization temperature of 100° C.

Certain preferred embodiments require a relatively long residence time at high temperatures for the particular in situ decontamination mechanisms to operate effectively, such as pyrolysis, thermal decomposition, distillation, and saturated or superheated steam distillation. Temperatures of 300° C. to 400° C. are necessary or at least desirable and residence times as long as two weeks. RF heating according to the present invention is well suited for such decontamination.

Temperature and residence time requirements for the thermal decomposition of chlorinated hydrocarbons (HCs) have been estimated by extrapolating data obtained by Duvall, et al. for the incineration of hexachlorobenzene (HCB); Duvall, D. S., W. A. Rubey, and J. A. Mescher, "High Temperature Decomposition of Organic Hazardous Waste" *Treatment of Hazardous Waste, Sixth Annual Research Symposium*, D. Schultz, ed., Chicago, EPA 600/9-80-011, 1980, pp. 121–131. This approach was used to obtain preliminary engineering estimates of the required time and temperature in the absence of data for thermal decomposition at low temperatures and long residence times. The data of Duvall et al. show that HCB can be 99.998 percent decomposed at 1000° C. with a residence time of 2 seconds.

Based on these data, a rate constant of $\frac{1}{2}$ sec$^{-1}$ and an assumed reasonable activation energy of 30 kcal/mole, the Arnenhius equation was used to estimate time and temperature requirements. At 344° C., the calculated residence time is 7 days for 99.998 percent decomposition of HCB. In situ treatment can easily provide such long residence times economically because a costly large-volume reactor is not required. Other decontamination mechanisms such as vaporization, distillation, or steam distillation also help in the recovery of contaminants. These can be collected at the surface of the landfill by an appropriately designed vapor barrier and gas collection system.

Many hazardous substances are hydrocarbons (HC) boiling between 80° and 420° C. Heating these compounds to 300° to 400° C. would recover a large fraction of the components by vaporization and distillation. Distillation is further assisted by the presence of moisture in the landfill, since, in the presence of steam, the boiling point of the HC/water mixtures is depressed. This mechanism, however, is effective only for those HCs with vapor pressures of the same order of magnitude as water.

In Table 1, the boiling point reduction for some HCs in the presence of water is compared with their normal boiling points. This table shows that steam distillation can be performed with reasonable quantities of steam, provided the vapor pressure of the component is of the same order of magnitude as that of water.

TABLE 1

Boiling point reduction and ideal steam requirements for steam distillation

| Component | Mixture boiling temp. (°C.) | Pure component boiling point (°C.) | lb steam/ lb component |
|---|---|---|---|
| Benzene | 68.3 | 80.1 | 0.092 |
| Toluene | 83.9 | 110.6 | 0.236 |
| Bromoform | 94.3 | 150.0 | 0.311 |
| Chlorobenzene | 91.0 | 112.5 | 0.405 |
| Hexachloroethane | 98.7 | 186.0 | 1.57 |

For components boiling at temperatures more than twice that of water, steam distillation requires unreasonably large quantities of saturated steam. Such compounds, however, can be distilled in the presence of superheated steam. The steam acts as a sweep gas that continuously carries the vapors away from the surface where evaporation is occurring, ensuring a good vaporization rate. The PCB mixtures of the sort sold by Monsanto Chemical Co. under the trademark Aroclor, trichlorophenol, and benzidine are examples of hazardous chemicals that can be distilled with superheated steam.

Preliminary estimates were made for the amount of the PCB Aroclor 1260 that can be distilled with superheated steam generated in situ. This calculation is based on equilibrium and thermodynamic considerations. The results shown in Table 2 are based on the following assumptions: the landfill contains 5 wt percent moisture, 25 percent of the total moisture present in the landfill gets superheated to between 300° and 400° C., approach to equilibrium is only 25 percent, and the landfill area is 1 acre, depth 20 ft.

TABLE 2

Temperature required for superheated-steam distillation of Aroclor 1260

| Aroclor in landfill mass (percent) | Weight of Aroclor distilled (lb × 10$^6$) | Mass of steam per lb of Aroclor | Required temperature (°C.) |
|---|---|---|---|
| 1.1 | 1.43 | 1.13 | 300 |
| 5.8 | 7.7 | 0.21 | 350 |
| 26.0 | 35.0 | 0.04 | 375 |

The results in Table 2 show that, with a fixed amount of available moisture, larger amounts of Aroclor 1260 PCB can be distilled as the temperature is increased. Aroclor 1260 PCB was selected in the above example as a worst case, because it has the highest boiling range (385° to 420° C.) of the PCB family.

The RF power will raise the temperature of the landfill so that the decontamination mechanism begins to operate; the decontamination mechanisms will themselves decompose, pyrolyze, distill, and vaporize the contaminants. The vapor and gas recovery mechanisms will allow the gases to escape preferentially toward the landfill surface, where they can be collected for ultimate disposal.

Similar conditions are necessary for the oxidation and/or gasification of the hydrocarbon fraction of the hazardous materials. The contaminated region is made permeable and heated to an elevated temperature. Then oxygen, air and/or steam may be injected at the boundaries of the contaminated volume and the reaction allowed to occur over an extended period of time.

Similarly, there has been interest in adding appropriate reagents for reacting with the contaminants. A difficulty here has been the inability to deliver the reagent to decontaminate deep in the landfill in the presence of water and/or in impermeable regions. The moisture occupies the pore spaces, preventing entry of other liquids. Also the presence of water may prevent wetting or other desired chemical reactions. The present invention removes the water and makes the region permeable, wettable and reactive to reagents.

Figure 1:
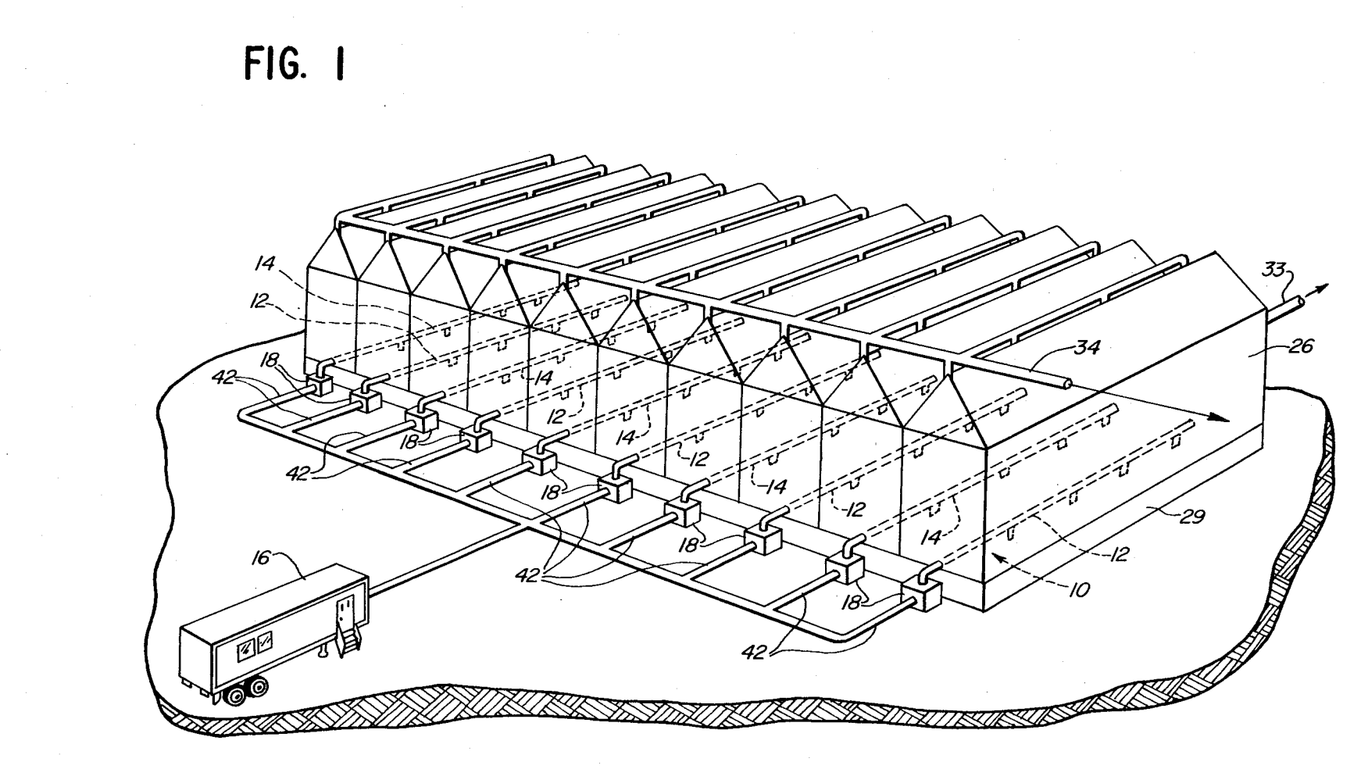
FIG. 1 is a perspective view of an RF heating system according to the present invention.
Figure 2:
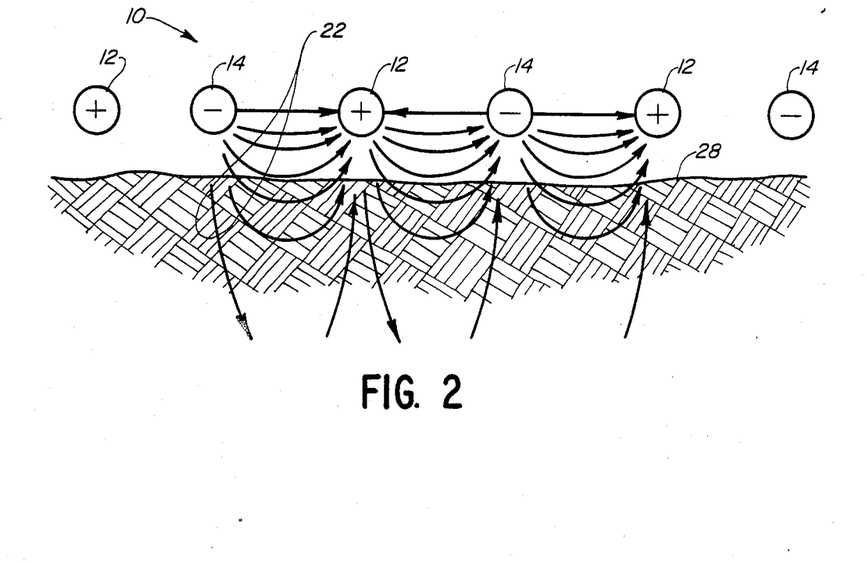
FIG. 2 is a sectional view, partly diagrammatic, of the transmission line array shown in FIG. 1 as related to an underlying contaminated landfill and showing displacement current distribution, taken transversely of the electrodes of the array.
Figure 3:
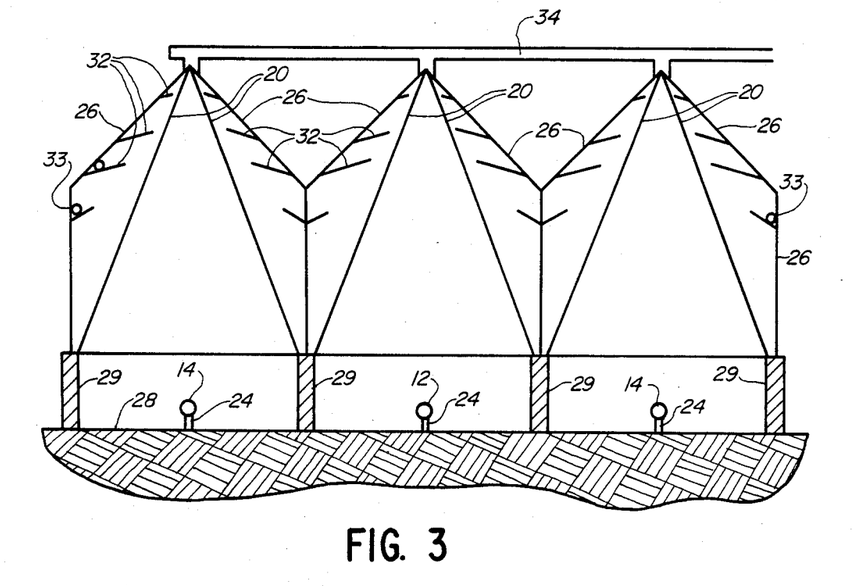
FIG. 3 is a sectional view taken along the same section as FIG. 2 but additionally showing associated support and collection structure.

A preferred embodiment of an RF heating system in accordance with the present invention is shown in FIGS. 1, 2 and 3. The system includes a bound-wave fringing-field transmission line excitor 10 in the form of an array of conductors (electrodes) 12, 14 supplied with RF power from an RF source 16 by way of one or more matching circuits 18.

The bound-wave fringing-field transmission line excitor makes use of the fringing fields that exist near a transmission line. The electric fields decay exponentially at distances greater than the spacing between conductors. This principle allows the depth of heating to be roughly controlled by altering the spacing between the conductors of the line. The depth of heating also depends on the water content of the soil. Consequently, the surfaces nearest the conductors will be heated first by displacement currents. As this heat dries out the soil, RF energy will be selectively absorbed at more distant, more moist locations. This allows the RF energy to gradually penetrate and heat layers deeper into the deposit. The heating zone is eventually restricted because of the exponential fall-off of the fields into the landfill. The heating will not be uniform, but this is not a requirement for this application. In fact, it permits the heating to be relatively restricted to the landfill rather than extending wastefully beyond.

Because the electric fields are "bound" to the transmission line (as opposed to the fields near an antenna, which are caused to radiate), the amount of radiated energy will be limited. It may still be necessary, however, to provide electromagnetic shielding 20 to ensure that acceptable and nonhazardous levels of radiation will occur just outside the processing area. A metal foil can be used for this purpose.

FIG. 2 shows the array of simultaneously excited horizontal pairs of conductors 12, 14 of transmission lines and lines 22 of displacement current expected where the deposit is dry near the horizontal wire pairs. To compensate for the field null that occurs beneath each excited line, as well as other nonuniformities, it is possible to energize alternately other conductors lying midway between those shown. Thus by periodic switching of the energized conductors a more uniform heating pattern may be obtained. According to electrostatics theory, the depth of penetration of the fields into the ground is a function of the conductor spacing. Thus the conductor spacings may be optimized for the best application of the array. Further, the penetration depth of fields generated by a given array may be controlled by changing the frequency as the moisture is vaporized from the surface layers.

The presence of metal drums or similar metal objects will have the effect of distorting the electric field in the immediate vicinity of these objects. This will enhance the heating rate in the immediate vicinity of the drum and suppress the heating rate in other areas. However, because of thermal diffusion, these localized thermal anomalies can be expected generally to be more or less equalized.

Typical metal trash can be left in place provided that the sizes are small compared to the separation of the electrodes. For example, large 0.16 m$^3$ (42 gal) oil drums would not pose a serious problem. Depending on the melting point of the metal it will either remain intact or not. If temperatures as high as 400° C. are to be reached, some solders could melt.

In general, the presence of a highly conducting object in a lossy dielectric medium tends to reduce the total energy requirements. This reduction is roughly proportional to the respective volumes of the different materials.

The effect of frequency on the heating pattern introduced by buried metal objects is normally expected to be minimal because the wavelength with respect to the size of the junk is expected to be large. As a consequence, quasistatic relationships will hold which tend to minimize changes in local heating perturbations with frequency. On the other hand, if very high frequencies are employed, some scattering and shadowing effects may be anticipated. Such use of high frequencies is not normally contemplated.

Large objects such as metal steel drums do not pose a serious perturbation in the RF heating methods and, therefore, a detailed survey of the site for such objects is not required. However, some preliminary investigations would be needed to determine whether or not larger objects exist. This could be done on the basis of historical records. If very large objects are likely, the site should be surveyed by means of metal locators, magnetometers, or subsurface radars. The electrode array can be tailored to take into account the larger objects. All of the survey techniques are routinely applied on a commercial basis and do not require any new technological developments.

FIG. 3 is a cross sectional view of the array showing the electrodes 12, 14, electrode supports 24, ground planes (shielding) 20 and a vapor barrier 26. This array is designed to operate at two frequencies, 6.78 and 27.1 MHz.

In the specific design illustrated, the electrodes 12, 14 are supported off the landfill surface 28 by electrode supports 24 comprised of alumina blocks. There are 10 rows of electrodes per acre, and each row is 63.6 m (209 ft.) long. The electrodes 12, 14 are made from 15 cm (6 in.) diameter copper-clad steel pipes. The vapor barrier 26 comprises metal buildings erected over the site of the landfill on a concrete foundation 29. The illustration shows an "A" frame metal structure commonly known as a Butler building. The roof of this building is used as a heat transfer surface to condense a fraction of the vapors rising from the landfill surface. This will help to reduce the heat load on a cooler/condenser 30 (FIG. 4), permitting a smaller unit to be used. A system of baffles 32 is attached to the roof. These run the entire length of the building and act as channels for the collection of the condensate through a conduit 33. Gas effluent is collected and carried off in ducts 34.

The interior surfaces of the building may be coated with strippable paint. When the treatment is over, the paint can be stripped from these surfaces to decontaminate the building.

Figure 5:
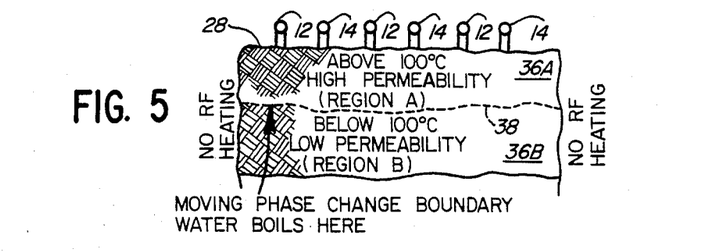
FIG. 5 is a diagrammatic illustration of a landfill heated above the boiling point of water by the system shown in FIG. 3.

The RF exciter electrode array will develop a temperature and heating profile characterized by a penetrating phase change boundary at which water boils. FIG. 5 is a sketch of the landfill 36 with a horizontal dashed line 38 representing this boundary. The temperature above this boundary will be higher than 100° C., and the temperature below it less than 100° C. In the higher temperature region, region 36A, the permeability of the soil to flow of gases and vapors will be several fold greater than the native permeability of the landfill in the lower region 36B. The permeability of the landfill will increase due to vaporization of water and the low boiling point HCs present in the pore space.

Figure 6:
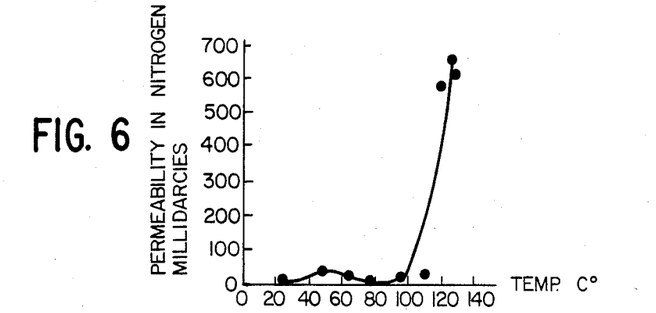
FIG. 6 is a graph showing the development of permeability upon the RF heating of a mineral resource.

The development of permeability will be directional because it will be confined to those regions where low boiling liquids have evaporated. Thus the region of high temperature, high permeability overlies the phase change boundaries for water. The steam will become superheated as it moves toward the surface through the high temperature, high permeability zone of the landfilll. On its way to the surface, the superheated steam will sweep the vapors of the higher boiling components present in region 36A. The development of directional permeability will depend upon the particular landfill 36, but may well be comparable to the development of permeability in the RF heating of tar sands, for which extensive data have been taken. FIG. 6 illustrates the increase in permeability of a tar sand core above the boiling point of water.

A vapor barrier 26 placed above the heated landfill surface 28 will confine and collect the vapors rising to the surface. These gases and vapors will be treated for ultimate disposal by a combination of incineration and on site treatment.

Figure 4:
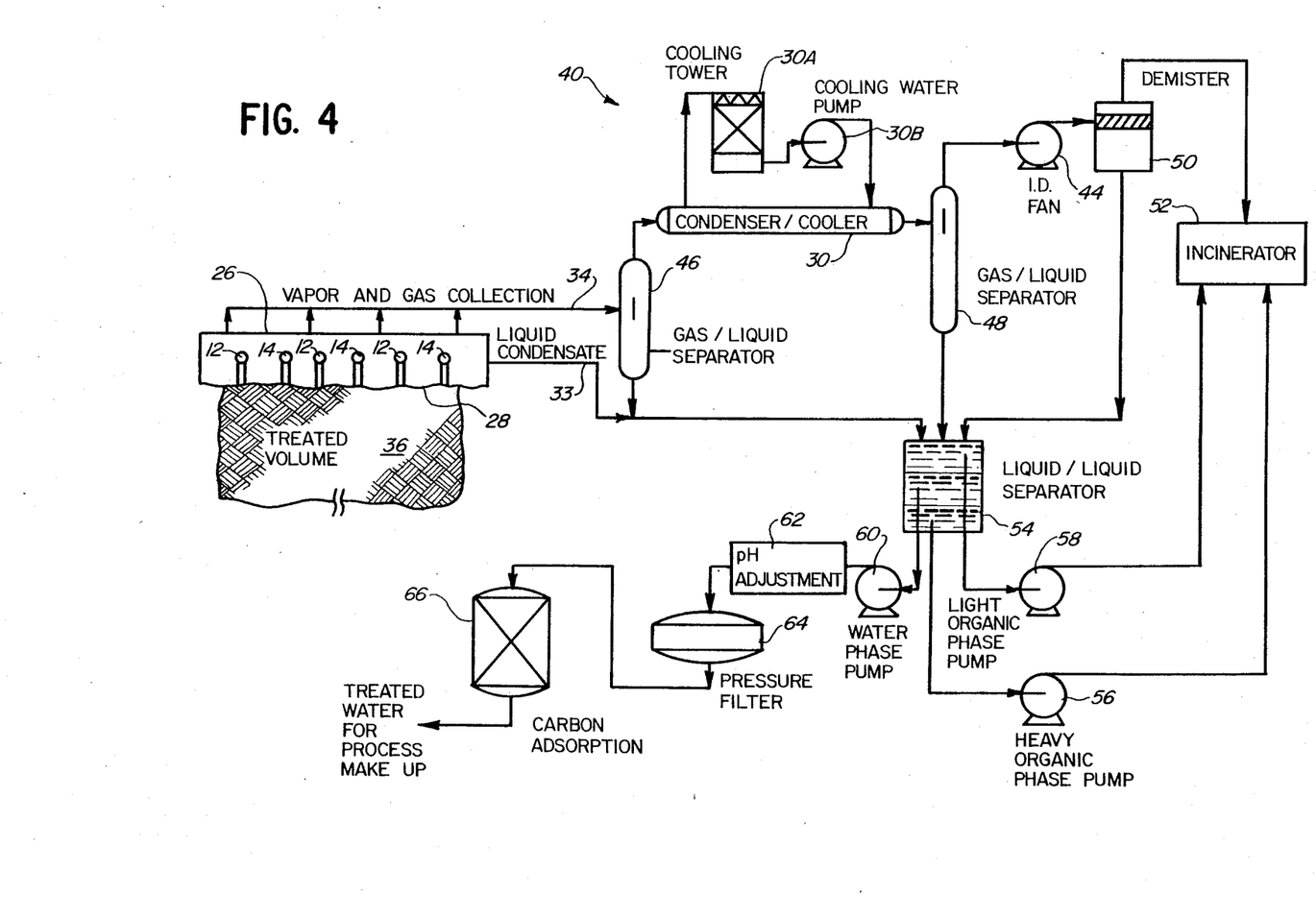
FIG. 4 is a diagrammatic illustration of the process flow for the heating and decontamination system shown in FIG. 3.

The process flow sheet shown in FIG. 4 was developed for the specific heating and decontamination system shown in FIG. 3 wherein rows of horizontal electrodes 12, 14 are placed a short distance above the surface 28, and a vapor barrier 26 is placed over the electrodes. Collection ducts 34 carry the gases and vapors to a mobile treatment plant. The vapor barrier is designed to operate under a slight vacuum to prevent venting of the hazardous gases and vapors to the environment. Liquids are carried off in pipes 33.

The impedance matching networks 18, RF source 16, and other RF hardware (not shown) are placed outside the vapor barrier 26. Coaxial cables carry RF power to energize individual electrodes. An induced draft (ID) fan 44 carries the gases through a gas handling system consisting of a gas/liquid separator 46, the condenser/cooler 30 (with its associated cooling tower 30A and cooling water pump 30B), and another gas/liquid separator 48. The outlet of the ID fan discharges to a demister 50.

The uncondensed gases from the demister outlet are incinerated on site in a mobile incinerator 52 such as the type designed and built by EPA-ORD. The liquid phase from both the separators and the demister is collected in a separator 54 where the water-rich phase is separated from the HC phases. The liquid HC phases also are incinerated on site, being driven thereto by a heavy organic phase pump 56 and a light organic phase pump 58. The water-rich phase is treated on site, being pumped by a water phase pump 60 to a pH adjustment station 62 and through a pressure filter 64 and a carbon adsorption system 66. The treated water may be used for process make-up water or otherwise purified, used or disposed of.

Other alternative process designs are possible: for example, on site incineration of all the gases and vapors without condensation, carbon adsorption instead of incineration of uncondensable gases, or treatment of liquid phases at off site locations.

Other alternatives are also within the present invention. For example, there are other vapor barrier designs that can be used to avoid the problem of decontamination of the barrier because they are relatively cheap and may be left as a permanent cap on the surface of the treated landfill.

Figure 7:
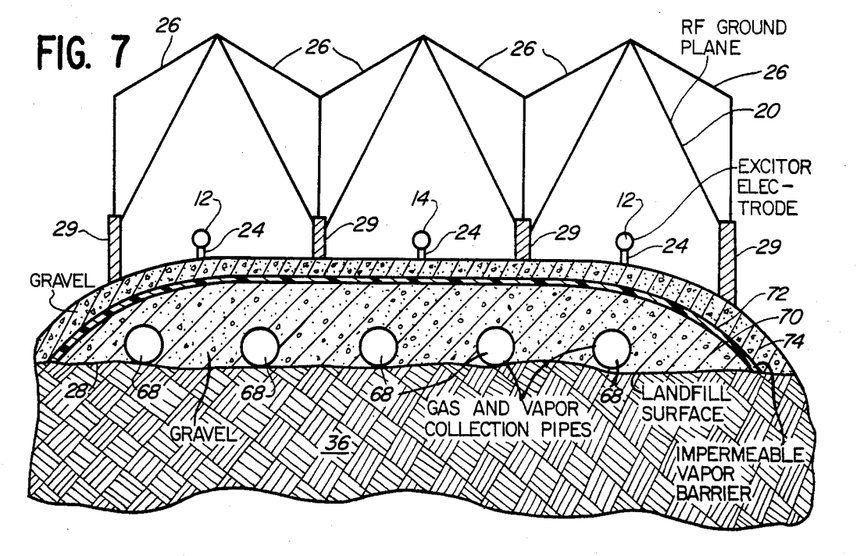
FIG. 7 is a vertical cross-sectional view comparable to FIG. 3, showing an alternative embodiment of the invention.

One such alternative design is illustrated in FIG. 7. In this embodiment of the invention, ducts 68 serve the purposes of the ducts 34 and 33 in carrying off gases and liquids. They are placed on the surface 28 of the landfill 36 and covered with gravel 70. A permanent impermeable vapor barrier 72 is sealed in place over the landfill and covered with further gravel 74. The excitation electrodes 14, 16 and ground plane shielding structure 20 are erected over that.

What is claimed is:

1. A system for the in situ decontamination of a region at or near the surface of the earth contaminated with hazardous materials comprising
   a transmission line excitor disposed adjacent said region,
   a source of radio frequency energy,
   means for coupling said radio frequency energy to said transmission line excitor, the dimensions of said excitor relative to the wave length of said radio frequency assuring that said energy is substantially bound to said excitor to act as a bound-wave fringing-field excitor without substantial radiation, and
   means for collecting fluid materials from said region and disposing of them.

2. A system according to claim 1 wherein said means for collecting and disposing comprises a containment structure disposed over said region for containing and collecting vapors emanating from said region, and means for condensing at least a portion of the vapors collected.

3. A system according to claim 2 wherein said structure includes a vapor barrier and an electromagnetic shield.

4. A system according to claim 3 wherein said means for collecting and disposing further comprises means for rendering relatively innocuous collected vapors and condensed vapors.

5. A system according to claim 4 wherein said means for rendering innocuous comprises an incinerator.

6. A system according to claim 5 wherein said means for condensing includes a heat exchanger.

7. A system for the in situ decontamination of a region at or near the surface of the earth contaminated with hazardous materials comprising
   a transmission line excitor,
   a source of radio frequency energy,
   means for coupling said radio frequency energy to said transmission line excitor, the dimensions of said excitor relative to the wave length of said radio frequency assuring that said energy is substantially bound to said excitor to act as a bound-wave excitor without substantial radiation, and a said excitor being disposed relative to said region to couple bound energy therefrom to materials in said region,
   a containment structure disposed over said region for containing and collecting vapors emanating from said region, said containment structure including a vapor barrier and an electromagnetic shield, and
   means for condensing at least a portion of the vapors collected.

8. A system according to claim 7 wherein said means for collecting and disposing further comprises means for rendering relatively innocuous collected vapors and condensed vapors.

9. A system according to claim 8 wherein said means for rendering innocuous comprises an incinerator.

10. A system according to claim 9 wherein said means for condensing includes a heat exchanger.

11. A system according to any one of claims 1 to 10 wherein said transmission line excitor comprises a plurality of substantially parallel electrodes supported in spaced relation above the surface of the earth over said region and insulated therefrom.

12. A method for the in situ decontamination of a water-containing region at or near the surface of the earth contaminated with harzardous materials comprising
   heating said region with bound radio frequency energy from a bound-wave fringing-field transmission line excitor disposeed outside said region to a temperature to boil water and thereby increase the permeability of the region, said energy being bound to said excitor without substantial radiation, said heating being continued by dielectric heating after said water has boiled from at least a portion of said region to heat said portion to elevated temperatures substantially above the boiling point of water,
   rendering said hazardous materials relatively innocuous, and
   capturing and disposing of effluents from said region.

13. A method for the in situ decontamination of a water-containing region at or near the surface of the earth contaminated with harzardous materials comprising
   heating said region with bound radio frequency energy from a bound-wave transmission-line excitor array to a temperature to boil water and thereby increase the permeability of the region, said energy being bound to said excitor without substantial radiation, said heating being continued by displacement currents and dielectric heating after said water has boiled from at least a portion of said region to heat said portion to elevated temperatures substantially above the boiling point of water,
   rendering said harzardous materials relatively innocuous, and
   capturing and disposing of effluents from said region.

14. A method according to either one of claims 12 and 13 wherein said rendering said hazardous material innocuous includes adding at least one reagent to said region after said increase of permeability, which reagent reacts with at least some of said hazardous materials to form relatively innocuous materials.

15. A method according to claim 14 wherein said reagent comprises oxygen.

16. A method according to either one of claims 12 and 13 wherein said rendering said hazardous materials innocuous includes thermally assisted decomposition, wherein said portion of said region is maintained at elevated temperatures for an extended period of time.

17. A method according to either one of claims 12 and 13 wherein said rendering said hazardous materials innocuous includes maintaining said portion of said region at elevated temperatures for an extended period of time sufficient for substantial pyrolysis.

18. A method for the in situ decontamination of a water-containing region at or near the surface of the earth contaiminated with harzardous materials comprising heating said region with bound radio frequency energy from a bound-wave fringing-field transmission line excitor disposed above said region to a temperature above the boiling point of water to boil water and thereby increase the permeability of the region, said energy being bound to said excitor without substantial radiation, continuing said heating with bound radio frequency energy by dielectric heating after said water has boiled from an upper portion of said region to heat said upper portion to elevated temperatures substantially above the boiling point of water and evaporate at least some of said hazardous materials, at the same time boiling water in a lower portion of said region below said upper portion to provide steam drive driving vapors upward from said upper portion, containing and collecting vapors emanating from said upper portion, condensing at least a portion of the vapors collected, and rendering relatively innocuous any collected vapors and condensed vapors.

19. A method according to claim 18 wherein said rendering innocuous includes incineration.

* * * * *

UNITED STATES PATENT AND TRADEMARK OFFICE
CERTIFICATE OF CORRECTION

PATENT NO. : 4,670,634

DATED : June 2, 1987

INVENTOR(S) : Jack E. Bridges, et al.

It is certified that error appears in the above-identified patent and that said Letters Patent is hereby corrected as shown below:

TITLE PAGE, OTHER PUBLICATIONS,
Page 2, line 12, change "Epa-Ord" to --EPA-ORD--.

Column 2, line 7, after "upon" delete the comma.

Column 2, line 8, after "cooling" insert a comma.

Column 3, line 64, change "Conduction" to --conduction--.

Column 9, line 20, after "adjacent" insert --a--.

Column 9, line 59, delete "a".

Column 9, line 60, after "to" insert --a--.

Column 10, line 50, change "material" to --materials--.

Signed and Sealed this

Tenth Day of November, 1987

Attest:

DONALD J. QUIGG

*Attesting Officer*

*Commissioner of Patents and Trademarks*